United States Patent [19]
Starnes et al.

[11] Patent Number: 6,144,996
[45] Date of Patent: Nov. 7, 2000

[54] METHOD AND APPARATUS FOR PROVIDING A GUARANTEED MINIMUM LEVEL OF PERFORMANCE FOR CONTENT DELIVERY OVER A NETWORK

[75] Inventors: Darrell J. Starnes, Tomball; Amgad M. Elwahab, Houston; Jeffrey R. Gabler, Tomball; Steven C. Giap; Rupali M. Kothari, both of Houston; Svilen B. Pronev, Cypress; Christopher H. Stewart, Tomball, all of Tex.

[73] Assignee: Compaq Computer Corporation, Houston, Tex.

[21] Appl. No.: 09/133,482

[22] Filed: Aug. 12, 1998

Related U.S. Application Data

[60] Provisional application No. 60/085,309, May 13, 1998.

[51] Int. Cl.[7] .................................................. G06F 13/00
[52] U.S. Cl. ............................................................ 709/217
[58] Field of Search ................................... 709/201, 203, 709/212, 213, 214, 216, 217, 218, 219

[56] References Cited

U.S. PATENT DOCUMENTS

| 5,673,322 | 9/1997 | Pepe et al. ................................ 380/49 |
| 5,727,159 | 3/1998 | Kikinis .................................... 709/203 |
| 5,764,235 | 6/1998 | Hunt et al. . |
| 5,838,927 | 11/1998 | Gillon et al. ............................ 709/203 |
| 5,852,717 | 12/1998 | Bhide et al. ............................ 709/203 |
| 5,918,013 | 6/1999 | Mighdoll et al. ....................... 709/203 |
| 5,935,207 | 8/1999 | Logue et al. ........................... 709/219 |
| 5,964,891 | 10/1999 | Caswell et al. .......................... 714/31 |
| 5,991,810 | 11/1999 | Shapiro et al. ......................... 709/229 |
| 6,014,698 | 1/2000 | Griffiths ................................. 709/224 |
| 6,041,355 | 3/2000 | Toga ...................................... 709/227 |
| 6,049,821 | 4/2000 | Therianet ............................... 709/203 |

OTHER PUBLICATIONS

R. Fielding et al., "Hypertext Transfer Protocol–HTTP/1.1", HTTP Working Group, Aug. 12, 1996, pp. 1–110.
"WinGate 2.1 is Officially Released", www.wingate.net, 1997.
"WinGate Opens the Internet Door", LAN Times (www-.lanstimes.com/97/97jan/701b066a.html), Jan. 1997.
"Microsoft Proxy Server 1.0", Microsoft Corporation (www.microsoft.com/products/prodref/130_ov.htm).
"Microsoft Announces Proxy Server 2.0", Microsoft Corporation (www.microsoft.com/corpinfo/press/1997/oct97/proxy2pr.htm), Oct. 8, 1997.
"Microsoft Proxy Server 2.0; What's New", Microsoft Corporation (www.microsoft.com/proxy/guide/whatsnew:asp?a=2&B=1).
Microsoft Proxy Server 2.0; Technical Papers, Cache Array Routing Protocol (CARP) Whitepaper, Microsoft Corporation (www.microsoft.com/proxy/guide/CarpWP.asp?A=2&B=3).

*Primary Examiner*—Moustafa M. Meky
*Attorney, Agent, or Firm*—Akin, Gump, Strauss, Hauer & Field, L.L.P.

[57] ABSTRACT

A proxy system that offers connection services and acceleration services is disclosed. The acceleration services provide for accelerated delivery of content to requestors (e.g., clients) while guaranteeing a minimum level of service (for content delivery) to the requestors. The acceleration services are facilitated by improved techniques for rapid and efficient delivery of objects from a network (e.g., the Internet) to users. The improved techniques can be utilized in a variety of apparatuses, including a proxy having an acceleration apparatus (e.g., an acceleration server). The acceleration apparatus manages and monitors its utilization of processing resources so that performance of the proxy system can during worst case conditions guarantee a minimum level of service (for content delivery) to the requestors. The proxy system is also well suited for being scaled to provide additional processing resources.

20 Claims, 7 Drawing Sheets

METHOD AND APPARATUS FOR PROVIDING A GUARANTEED MINIMUM LEVEL OF PERFORMANCE FOR CONTENT DELIVERY OVER A NETWORK

CROSS-REFERENCE TO RELATED APPLICATIONS

This application claims the benefit of U.S. Provisional Application No. 60/085,309, entitled "METHOD AND APPARATUS FOR STORAGE AND DELIVERY OF CONTENT", and filed on May 13, 1998, the disclosure of which is incorporated herein by reference for all purposes.

This application is related to U.S. patent application Ser. No. 09/133,498, filed concurrently herewith, entitled "METHOD AND APPARATUS FOR PROVIDING ACCELERATED CONTENT DELIVERY OVER A NETWORK," still pending, and assigned to the assignee of the present application, which is hereby incorporated herein by reference for all purposes.

This application is related to U.S. patent application Ser. No. 09/133,791, filed concurrently herewith, entitled "ACCELERATED CONTENT DELIVERY OVER A NETWORK USING REDUCED SIZE OBJECTS," and assigned to the assignee of the present application, still pending, which is hereby incorporated herein by reference for all purposes.

This application is also related to U.S. patent application Ser. No. 09/133,497, filed concurrently herewith, entitled "METHOD AND APPARATUS FOR EFFICIENT STORAGE AND RETRIEVAL OF OBJECTS IN AND FROM AN OBJECT STORAGE DEVICE," and assigned to the assignee of the present application, still pending, which is hereby incorporated herein by reference for all purposes.

This application is also related to U.S. patent application Ser. No. 09/132,952, filed concurrently herewith, entitled "METHOD AND SYSTEM CONDENSING ANIMATED IMAGES," and assigned to the assignee of the present application, still pending, which is hereby incorporated herein by reference for all purposes.

This application is also related to U.S. patent application Ser. No. 09/133,514, filed concurrently herewith, entitled "IMAGE FORMAT CONVERSION WITH TRANSPARENCY COLOR ADJUSTMENT," and assigned to the assignee of the present application, still pending, which is hereby incorporated herein by reference for all purposes.

BACKGROUND OF THE INVENTION

1. Field of the Invention

The present invention relates to information retrieval and, more particularly, to accelerated retrieval of content information over a network.

2. Description of the Related Art

The Internet is a resource for tremendous amounts of content information. As examples, the content information can include text, images or other types of data. A user normally accesses the Internet using a connection provided by a modem and a regular telephone line or ISDN line, or by a T1 line or leased line. The connection to the Internet may be indirectly through an Internet Service Provider (ISP) or more directly to the Internet (or World Wide Web). The higher the bandwidth supported by the connection, the better the responsiveness of the Internet to the user's requests. For example, since a T1 line offers substantially greater bandwidth than does a 28.8 kbps modem and regular telephone line, the connection to the Internet provided by the T1 line will provide substantially faster responsiveness to a user's requests than would the 28.8 kbps modem.

Internet proxy servers have been used to allow multiple users to share Internet access through a common high speed connection. Examples of such Internet proxy servers are (1) WinGate available from Deerfield Communications Company and (2) Microsoft Proxy Server available from Microsoft Corporation. Shared connections facilitate providing firewalls to prevent unauthorized access into the user's (e.g., corporate) internal computers. These shared connections can also provide the Hypertext Transfer Protocol (HTTP) caching to allow improved responsiveness. These Internet proxy servers can also provide site filtering to prevent user (behind the Internet proxy server) access to certain Internet sites.

HTTP caching operates to locally store frequently accessed Internet material so that it becomes quickly available when subsequently requested. HTTP caching is described in the Hypertext Transfer Protocol (HTTP), version 1.1, which is hereby incorporated by reference. Such caching enables an organization to more efficiently share the bandwidth of the Internet connection.

Content negotiation is also known and described in the HTTP, version 1.1. Content negotiation is the process in which a HTTP response to a HTTP request is chosen to be that which is most suitable, assuming of course that there is a choice. The content negotiation can be client-driven or server-driven. The content differences being negotiated can vary widely but are nevertheless stored on a content server on the Internet. As an example, the content differences could be different languages or different size images. In such a case, a client may negotiate on behalf of a user with a content server to receive smaller (e.g., less robust, lower quality, or smaller image area) images instead of commonly provided larger images from the server. If the content server can provide the smaller images, then the user is able to receive and display the information (e.g., images) faster than had their been no choice or no negotiation. Thus, in some cases, the negotiation facilitates improved bandwidth utilization and responsiveness of the Internet.

One problem with the conventional approaches to content delivery over the Internet is that most content servers do not offer multiple versions of information content. As a result, content negotiation, even if available, is not supported by most content servers. There are also no standards on what types of versions or variations of information content a content server should make available. Consequently, content negotiation is difficult to obtain over the Internet.

Another problem is that while caching can improve responsiveness of the Internet to requests, it speeds only subsequent requests for the same information from a shared Internet connection. As a result, there is never any performance improvement for initial requests for information content from the Internet.

Thus, there is a need for improved techniques for rapid and efficient delivery of information content from the Internet to a user.

SUMMARY OF THE INVENTION

Broadly speaking, the invention relates to a proxy system that offers connection services and acceleration services. The acceleration services provide for accelerated delivery of content to requestors (e.g., clients) while guaranteeing a minimum level of service (for content delivery) to the requestors. In other words, the acceleration services provided by the invention operate to improve responsiveness of content delivery from a network (e.g., Internet) to requestors, yet at the same time ensures that acceleration services do not become overloaded or otherwise disruptive such that the acceleration services would hinder responsiveness.

The invention can be implemented in numerous ways, including as a method, an apparatus, a system, or a computer readable medium. Several embodiments of the invention are summarized below.

As a method for delivering an object to a requestor at a local computer, an embodiment of the invention includes the operations of: receiving, at an intermediate computer, a request for an object that is primarily stored on a remote computer, the local computer being capable of coupling to the intermediate computer via a first network, and the intermediate computer being capable of coupling to the remote computer via the second network; determining whether the requested object is available from an object store associated with the intermediate computer, the object store providing temporary secondary storage for objects; when it is determined that the requested object is available from the object store, retrieving the requested object from the object store, and supplying the retrieved object obtained from the object store to the requestor; and when it is determined that the requested object is being obtained but is not presently available from the object store, awaiting for a determined amount of time for the requested object to become available from the object store, subsequently retrieving the requested object from the remote computer when the requested object is still not available after the awaiting for the determined amount of time, and thereafter supplying the retrieved object obtained from the remote computer to the requestor.

As a method for delivering content from a remote machine to a local machine, where the local machine couples to a proxy machine, and the proxy machine couples to the remote machine through a network of computers, an embodiment of the invention includes the operations of: intercepting, at the proxy machine, a web page request in route from the local machine to the remote machine through the network; allowing the web page request to be sent from the proxy machine to the remote machine; delivering the requested web page to the proxy machine, the requested web page includes at least one image file request embedded in the requested web page; forwarding the requested web page from the proxy machine to the local machine; identifying, at the proxy machine, the at least one image file request in the requested web page; pre-fetching the identified at least one image file request, with the content for each of the image file requests being obtained from the remote machine associated with the image file request; attempting to produce an accelerated version for the identified at least one image file request at the proxy machine; issuing, from the local machine, the at least one image file request embedded in the requested web page subsequent to receiving the request web page at the local machine; intercepting, at the proxy machine, the at least one image file request in route from the local machine to the remote machine through the network; preventing the at least one image file request from being sent from the proxy machine to the remote machine for at least a determined period of time while the attempting to produce the accelerated version of the identified at least one image file request is ongoing; delivering the accelerated version of a requested image file for the identified at least one image file request to the local machine from the proxy machine when the attempting completes within the determined period of time; and alternatively, delivering an original version of the requested image file for the identified at least one image file request to the local machine from the proxy machine when the attempting does not completes within the determined period of time, the original version of the requested image file being obtained by the pre-fetching from the remote machine or by releasing the preventing so that the at least one image file request is sent from the proxy machine to the remote machine.

As a proxy system for distributing data objects, an embodiment of the invention includes: a proxy server and an acceleration unit. The proxy server operates to receive an object request having a requested object from a network browser and to manage the forwarding of the requested object to the network browser. The acceleration unit operates to identify the requested object, pre-fetch the requested object having an original size from a content provider coupled to the network, reduce the size of the retrieved object to a reduced size, and provide the requested object with the reduced size to the proxy server. Further, when the requested object with the reduced size is determined not to be available from the acceleration unit for more than a determined period of time, the proxy server obtains the requested object of the original size from the acceleration unit or from the content provider directly and provides the requested object having the original size to the network browser.

As a computer readable medium containing program instructions for delivering an object to a requestor at a local computer, an embodiment of the invention includes: first computer readable code for receiving, at an intermediate computer, a request for an object that is primarily stored on a remote computer, the local computer being capable of coupling to the intermediate computer via a first network, and the intermediate computer being capable of coupling to the remote computer via the second network; second computer readable code for determining whether the requested object is available from an object store associated with the intermediate computer, the object store providing secondary temporarily storage for objects; third computer readable code for retrieving the requested object from the object store, and supplying the retrieved object obtained from the object store to the requestor, when the second computer readable code determines that the requested object is available from the object store; and fourth computer readable code for awaiting for a determined amount of time for the requested object to become available from the object store, subsequently retrieving the requested object from the remote computer when the requested object is still not available after the awaiting for the determined amount of time, and thereafter supplying the retrieved object obtained from the remote computer to the requestor, when the second computer readable code determines that the requested object is being obtained but is not presently available from the object store.

The advantages of the invention are numerous. One advantage of the invention is that accelerated delivery of content to requesting clients is achieved while at the same time being able to guarantee a minimum level of service (e.g., responsiveness) to the clients. Substantial performance gains in responsiveness and bandwidth utilization are able to be achieved without running the risk that the acceleration processing overburden the system such that what would otherwise be performance gains turn into performance losses. In one case, the invention provides in the worst case the same level of service that would be perceived by the client if the proxy system according to the invention were performing only connection services as a conventional proxy server. Another advantage of the invention is that it mitigates the risk of implementing new features or functions to server systems by ensuring that they will not severely degrade the level of service provided.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
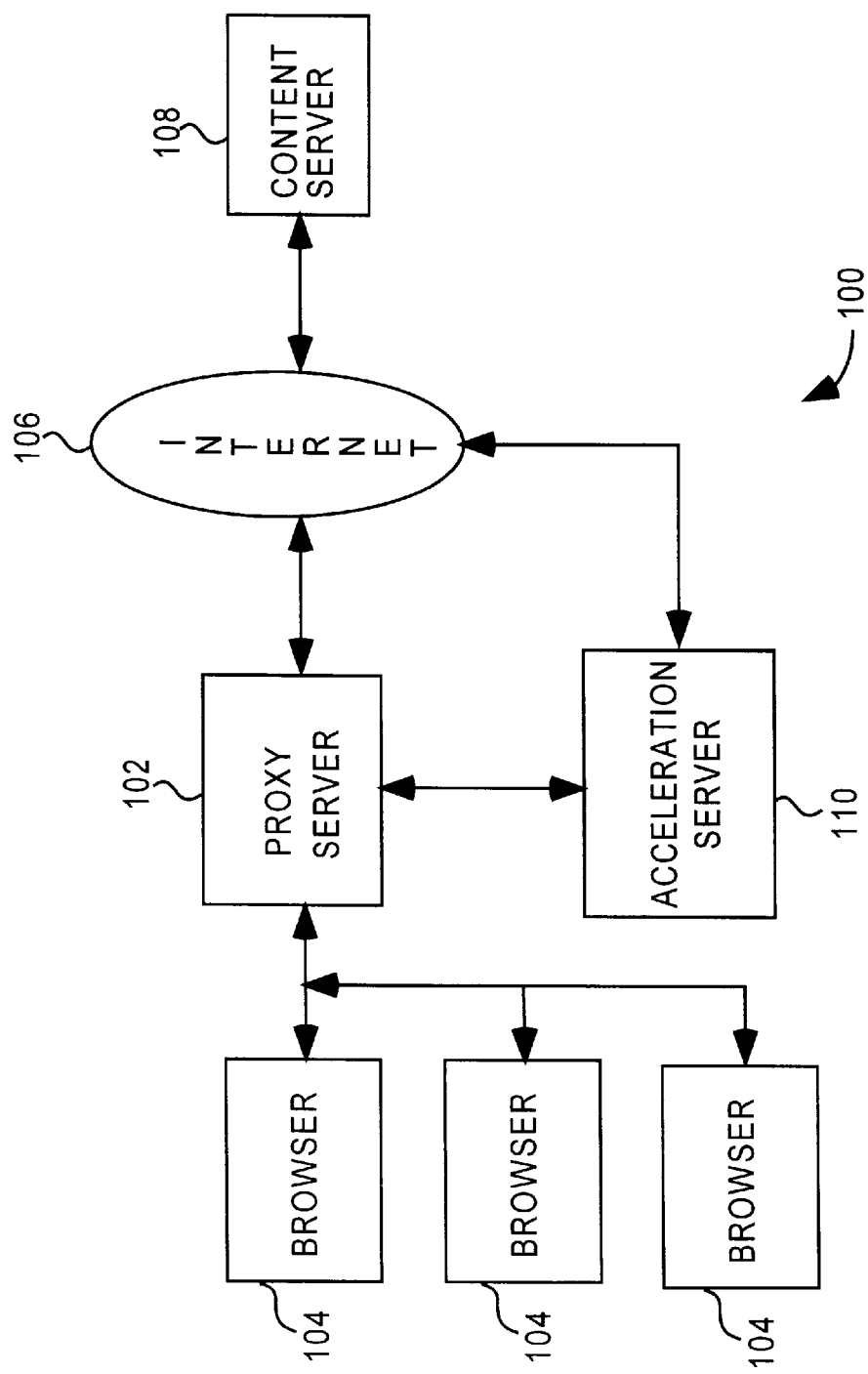
FIG. 1 is a proxy system that provides improved data delivery over a network according to an embodiment of the invention.

The invention relates to a proxy system that offers connection services and acceleration services. The acceleration services provide for accelerated delivery of content to requestors (e.g., clients) while guaranteeing a minimum level of service (for content delivery) to the requestors. In other words, the acceleration services provided by the invention operate to improve responsiveness of content delivery from a network (e.g., Internet) to requestors, yet at the same time ensures that acceleration services do not become overloaded or otherwise disruptive such that the acceleration services would hinder responsiveness.

The acceleration services are facilitated by improved techniques for rapid and efficient delivery of objects from a network (e.g., the Internet) to users. The improved techniques can be utilized in a variety of systems or apparatuses, including a proxy system having an acceleration apparatus (e.g., an acceleration server). Such a proxy system is able to produce an accelerated version of content information from the network, cache the accelerated version (and possibly original versions) for subsequent requests for the same information content, and supply the accelerated version of the information content to a requesting user.

However, the additional acceleration services provided by a proxy system according to the invention is an additional processing burden on the processing resources of the proxy system. In general, a proxy system operates as not only a server but also provides access for a plurality of clients. However, due to finite processing resources of the proxy system, the level of service provided to clients depends on the number of clients using the proxy system. In other words, if the processing overhead at the proxy system becomes to great, it adversely effects the level of service provided to the clients. The processing overhead is a product of many various processing tasks performed by a proxy system. Often these processing tasks result in errors caused by the proxy system or due to throughput problems. The acceleration services of the invention are also significant processing tasks. Clients of the proxy system will perceive that the remote servers are at fault, not the proxy system. Also, failures at the proxy system limits or prevents the clients from accessing the remote servers. Conventionally, when failures occur at the proxy system, an error is often returned to the client indicating that a retry at a later time is required. Alternatively, instead of a notification, the client would perceive a severe reduction in the level of service. The proxy system manages and monitors its utilization of processing resources (namely, for the acceleration services) so that performance of the proxy system can during worst case conditions guarantee a minimum level of service (for content delivery) to the clients. The proxy system according to the invention is also well suited for being scaled to provide additional processing resources and thus accommodate services to more active or a growing number of clients.

Embodiments of the invention are discussed below with reference to FIGS. 1–6B. However, those skilled in the art will readily appreciate that the detailed description given herein with respect to these figures is for explanatory purposes as the invention extends beyond these limited embodiments.

FIG. 1 is a proxy system 100 that provides improved data delivery over a network. The proxy system 100 includes the proxy server 102 that couples to network browsers 104. The proxy server 102 is also coupled to the Internet 106. The Internet 106 is a collection of interconnected computer systems, some of which act as content servers. Accordingly, FIG. 1 illustrates the Internet 106 coupled to a content server 108 as a representative one of the content servers associated with the Internet 106. Additionally, the proxy system 100 includes an acceleration server 110. The acceleration server 110 couples to the proxy server 102 as well as the Internet 106.

The proxy system 100 is able to provide improved content (data) delivery over the Internet 106. Namely, the proxy system 100 operates to speed up the response time that a user of one of the browsers 104 undergoes after requesting some content from the content server 108 until the requested content is supplied to the user at the one of the browsers 104.

The general operation of the proxy system 100 is as follows. Normally, as a user of one of the browsers 104 makes a request for data from a content server on the Internet 106. The proxy server 102 initially intercepts the request for data from the browser 104 and determines whether the request for data can be satisfied locally by the proxy server 102 or the acceleration server 110. When the proxy server 102 determines that the request for data cannot be satisfied locally, the proxy server 102 forwards the request for data to the content server 108 through the Internet 106. In this case, the previously intercepted request for data is passed through the proxy server 102 to the content server 108 via the Internet 106 so that the request for data can be satisfied in a conventional, unaccelerated manner.

On the other hand, when the proxy server 102 determines that the request for data can be satisfied locally with an improved response time (i.e., accelerated delivery) to the user, then the proxy server 102 and the acceleration server 110 operate to satisfy the request for data using information locally stored, thereby avoiding the need to traverse the sluggish Internet 106 and retrieve the requested data from the content server 108. Also, if the acceleration server 110 believes it can satisfy the request for data locally but the necessary information is not yet locally available, then the acceleration server 110 operates to retrieve the requested data from the content server 108 with a pre-fetch operation and then locally store the necessary information. Thereafter, the acceleration server 110 can satisfy the request for data from local storage. In either of these cases, the data returned to the browser 104 in response to the request for data will not only be locally available but also be reduced in size (e.g. reduced file size). Both of these features contribute to the ability of the proxy system 100 to significantly improve the response time in which the requested data can be delivered to the browser 104. Accordingly, the proxy server 102 acting together with the acceleration server 110 is able to accelerate the delivery of the requested data to the user of the browser 104 that has made the request.

During normal operation of the proxy system 100, the addition of the acceleration server 110 to the proxy system 100 causes the delivery of requested data to be delivered to a user in an accelerated manner. However, if the number of users (i.e., clients) being serviced by the proxy system 100 becomes significant and the number of accelerated versions needed at any point in time becomes too large for the acceleration server 110 to handle, this concentrated processing burden can cause the performance of the acceleration server 110, and thus the proxy system, to degrade. The invention resolves this potential problem by managing the load on the acceleration server 110 such that even in the worst case condition the performance of the proxy server 100 is, for example, no worse than it would be had the proxy system been a conventional proxy server (i.e., without acceleration capabilities).

Figure 2:
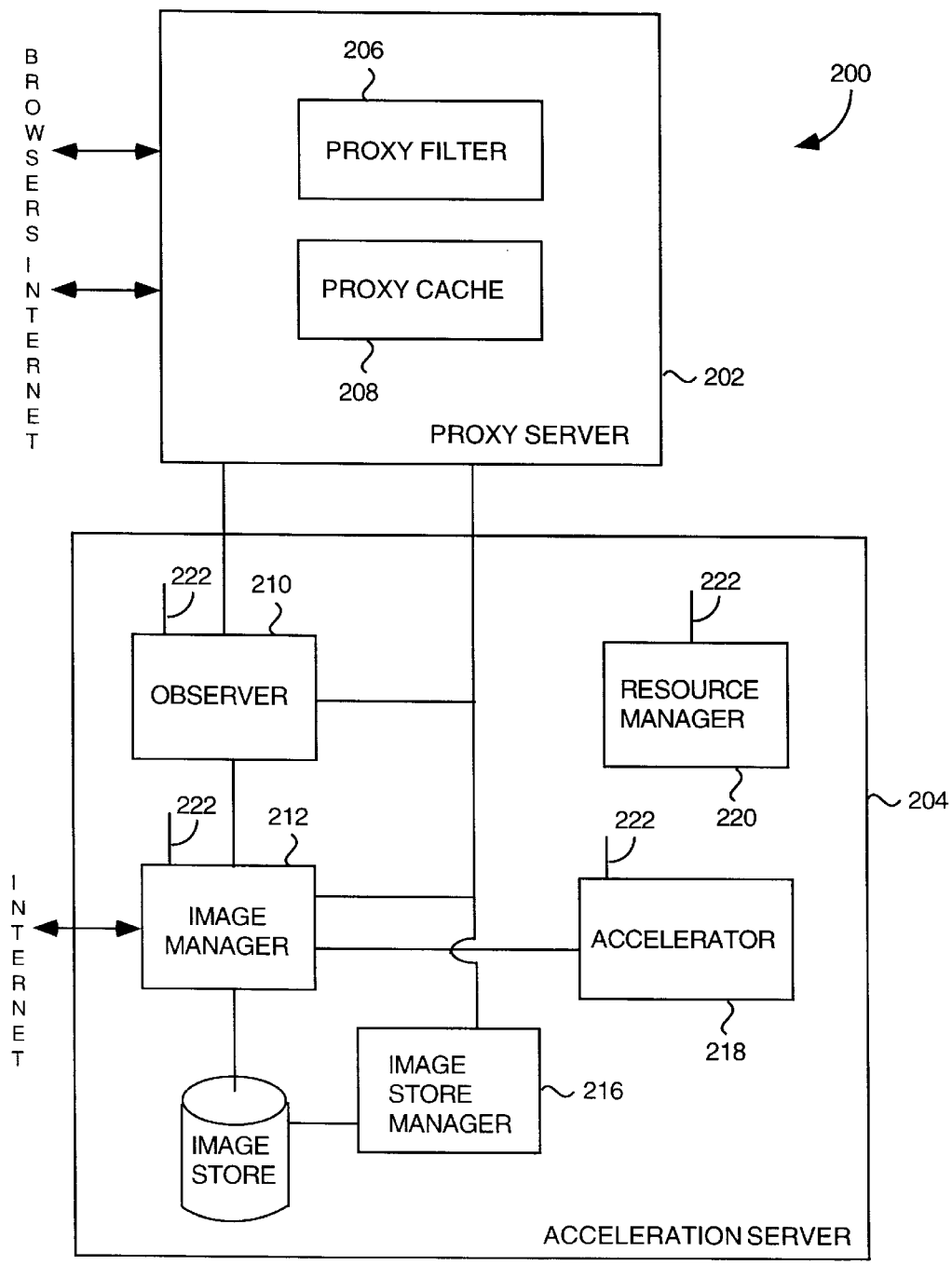
FIG. 2 is a block diagram of a proxy system according to an embodiment of the invention.

FIG. 2 is a block diagram of a proxy system 200 according to an embodiment of the invention. The proxy system 200 includes a proxy server 202 and an acceleration server 204. As an example, the proxy server 202 can correspond to the proxy server 102 illustrated in FIG. 1, and the acceleration server 204 can correspond to the acceleration server 110 in FIG. 1.

The proxy server 202 includes a proxy filter 206 and a proxy cache 208. The proxy filter 206 monitors requests for data received from the browsers 104. The proxy filter 206 then filters out those requests that it believes it can accelerate the delivery of the requested data to the user of the browsers 104. The proxy filter 206 then forwards these requests that it believes it can accelerate to the acceleration server 204. The proxy cache 208 operates as a cache storage area in which responses to earlier requests from the Internet 106 made by the browsers 104 can be temporarily saved and satisfied thereafter from the proxy cache 208 if any of the browsers 104 make the same request for data while the data remains stored in the proxy cache 208. Hence, the proxy cache 208 provides local storage for content data that was previously requested by one of the browsers 104, and thus provides rapid access to the same content data as long as the content data remains stored in the proxy cache 208. However, the content stored in the proxy cache 208 is not accelerated, but merely non-accelerated content obtained by the proxy server 202 from a content server through the Internet 106.

It should be noted that conventional proxy servers include a cache to temporarily store content obtained from a content server via the Internet. An example of such a conventional proxy server is Microsoft Proxy Server, produced by Microsoft Corporation. Hence, the proxy server 202 includes the proxy cache 208 because the proxy system 200 according to the invention can be built using a conventional proxy server suitably modified to include primarily the proxy filter 206. In other words, the proxy cache 208 need not be included in the proxy server 202 of the proxy system 200 or if provided can be disabled.

The proxy filter 206 supplies those of the data requests it believes it can accelerate to the acceleration server 204. For example, in a data request (e.g., World Wide Web page request) can be evaluated to determine if it includes images. Given that images are separate files that tend to have relatively large file sizes, images are good candidates for acceleration. Hence, a data request associated with one or more images files (such as many World Wide Web pages) is an example of a data request that the proxy filter 206 would believe it could accelerate. Also, another common data request would be an image request, (e.g., GET image request in HTTP) for a particular image file from a content server via the Internet. The proxy filter 206 would also believe it could accelerate the delivery of such image files.

The acceleration server 204 includes various components to perform processing operations used in producing and/or supplying an accelerated response to a data request back to the proxy server 202. The major components of the acceleration server 204 are illustrated in FIG. 2 and discussed below.

An observer 210 receives a data request via the proxy filter 206. The observer 210 examines the data request to identify images associated therewith. In this embodiment, the acceleration server 204 is operating to accelerate the delivery of images to the browser 104 that made the request for data that is or includes the images. The identified images are then forwarded to an image manager 212. The image manager 212 determines whether the desired images are already stored in an image store 214. The image manager 212 can determine those images already stored in the image store 214 using an image store manager 216. If the desired images are already stored in the image store 214, copies of the desired images are supplied from the image store 214 to the proxy server 202 and then forwarded from the proxy server 202 to the requesting browser 104. On the other hand, if the image manager 212 determines that the requested images are not yet stored in the image store 214, then the images can be obtained directly from the Internet by the image manager 212 using a high speed connection. Once retrieved, the images are evaluated to determine whether they can be accelerated by an accelerator 218. If the images can be accelerated, then the accelerator 218 produces an accelerated version of the image and stores the accelerated version in the image store 214. Additionally, the image manager 212 can also store an original version of the image in the image store 214. Thereafter, the proxy server 202 can return the requested image to the requesting browser 104 in a rapid manner. When the proxy server 202 has an accelerated version of the image to return to the browser 104, the response time to the browser 104 is even further improved by the proxy system 200. Namely, the time to transmit a file (e.g., image file) from the proxy system 200 to one of the browsers 104 is proportional to file size. Therefore, given that the accelerated versions have a smaller size, the accelerated versions can be transmitted to the browsers 104 in a reduced amount of time (i.e., improved response time). Also, in cases of excessive processing load, the acceleration server 204 can take appropriate action to reduce the processing load due to production of accelerated versions so that the overall responsiveness of the proxy system 200 is not hindered even in worst case conditions.

In one embodiment, the components of the acceleration server 204 monitor their own level of service and availability. These components can also monitor the level of service and availability of the system with which they communicate. The components include a recovery mechanism to provide a minimal level of service. The recovery mechanism uses a combination of timers, resource level tracking and retry logic to provide a minimal level of service. If necessary, the processing can be disabled for a particular request. In general, each component is responsible for the level of service that it provides. Hence, as a hierarchy, each level of the system, provides and maintains a minimum level of service, thus allowing the proxy system to provide a minimum service level.

Although the acceleration server 204 illustrated in FIG. 2 illustrates only a single image manager 212 and a single accelerator 218, it should be recognized that the architecture of the proxy system 200 is such that a plurality of image mangers and accelerators can be provided. In other words, the acceleration server 204 and/or its components are scaleable. By being able to extend the processing capabilities of the acceleration server 204 in this manner, the proxy system 200 can scale to handle a wide range of loads by distributing the processing across the available processing resources. A resource manager 220 supplies configuration information 222 to the observer 210, the image manager 212, and the accelerator 218. In a case in which there are multiple image managers or accelerators, the resource manager 220 forwards the necessary configuration and initialization information to the image managers and accelerators.

Additional details on the operation of the proxy system 200 are described in detail below with respect to FIGS. 4–6D.

Figure 3:
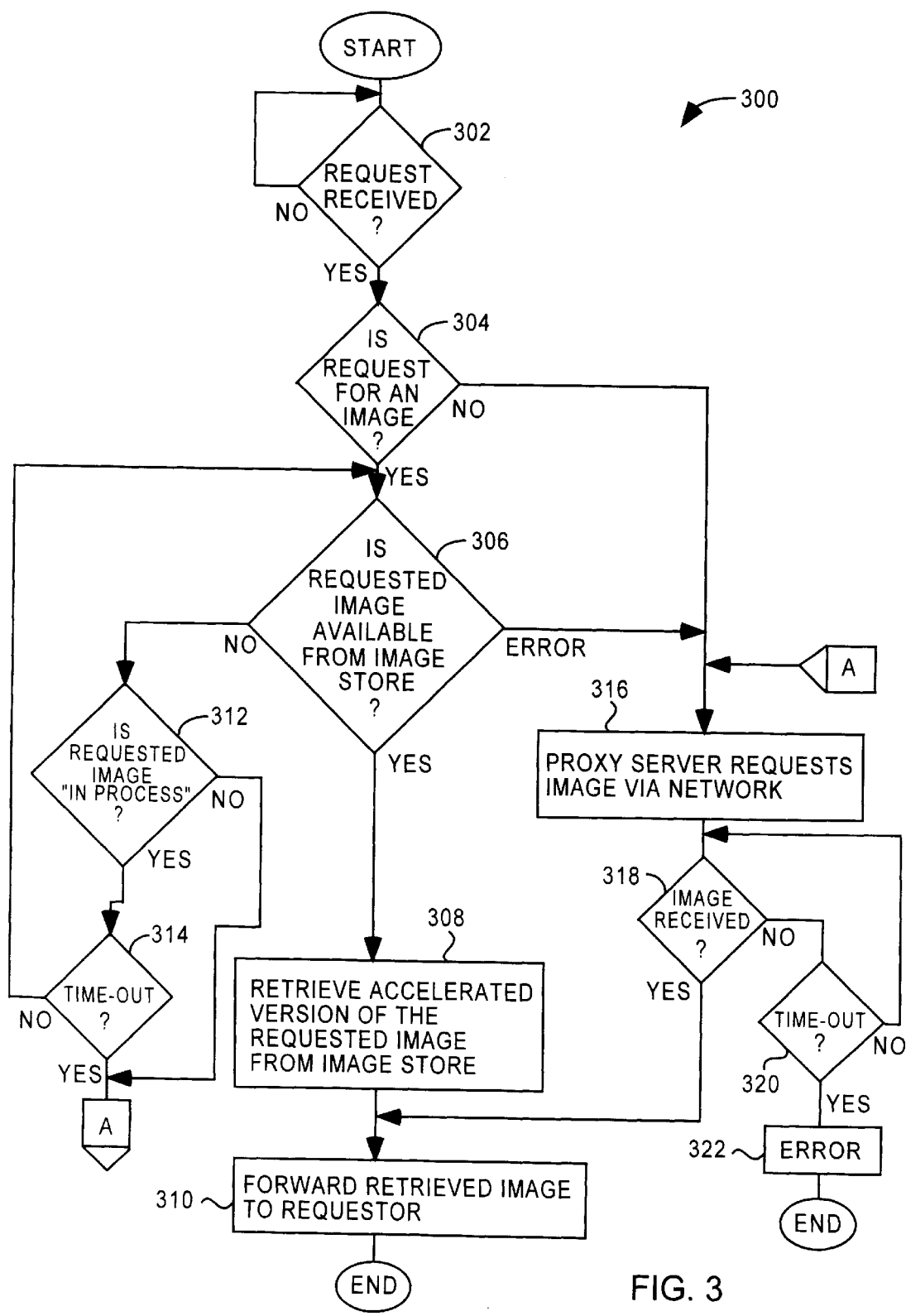
FIG. 3 is a flow diagram of GET image processing according to an embodiment of the invention.

FIG. 3 is a flow diagram of GET image processing 300 according to an embodiment of the invention. The GET image processing 300 is, for example, performed by the acceleration server 110, 204 in conjunction with the proxy server 102, 202.

Initially, the GET image processing 300 uses a decision block 302 to determine a request has been received. When the decision block 302 determines a request has not yet been received, the GET image processing 300 awaits the reception of such a request. Once a request has been made, the GET image processing 300 continues.

Next, decision block 304 determines whether the request that has been received is for an image. In general, the request can be received by the proxy server 102, 202 and the proxy server 102, 202 can determine whether the request is for an image or some other type of request (e.g., page request). When the request that has been received is for an image, a decision block 306 then determines whether the requested image is available from an image store. In one embodiment, the image store manager 216 can determine whether the requested image is available from the image store 214.

When the decision block 306 determines that the requested image is available from the image store, the accelerated version of the requested image is retrieved 308 from the image store. In other words, in this embodiment, it is assumed that the image store is configured to store accelerated versions of images that have been previously requested, retrieved from content servers via the Internet, and processed to produce the accelerated versions. After retrieving 308 the accelerated version of the requested image, the retrieved image is forwarded 310 to the requestor. In one embodiment, the proxy server 102, 202 operates to transmit the requested image that is retrieved from the image store to the requestor. Following the forwarding provided by block 310, the GET image processing 300 is complete and ends because the requestor has received the image that was requested. In this case, the requestor received an accelerated version of the requested image.

On the other hand, when the decision block 306 determines that the requested image is not available from the image store 214, then a decision block 312 determines whether the requested image is "in process." When the requested image is "in process," it is understood that the acceleration server 110, 204 is in the process of producing the accelerated version of the requested image. Hence, in this case, the GET image processing 300 can temporarily await the completion of the requested image that is currently "in process." When the requested image is determined to be "in process," a decision block 314 determines whether a time-out has occurred. The time-out is used to control the maximum amount of time that the GET image processing 300 is going to wait for the requested image that is "in process" to complete. Hence, when the decision block 314 determines that a time-out has not occurred, then processing returns to repeat a decision block 306 and subsequent blocks. This time-out control is used to ensure a minimum level of performance for the delivery of the requested content requested from the Internet. If the requested image becomes available within the time-out period, then the requested image is retrieved and forwarded to the requestor in blocks 308 and 310.

On the other hand, when the decision block 306 determines that an error condition arose when attempting to determine whether the requested image was available in the image store, the GET image processing 300 also aborts its attempt to produce an accelerated version of the image that has been requested. Here, the proxy server 102, 202 requests 316 the image from the content server via the network (e.g., Internet). Next, a decision block 318 determines whether an image has been received from the content server via the network. If the image has not yet been received, a decision block 320 determines whether a time-out has occurred. If a time-out has not yet occurred, the processing returns to the decision block 318 and subsequent blocks to complete the reception of the image from the content server via the network. However, if the decision block 320 determines that a time-out has occurred, an error condition is noted 322 and returned to the requestor. In any case, when the decision block 318 determines that the requested image has been received from a content server via the network, block 310 is performed to forward the retrieved image to the requester. Following block 310, the GET image processing 300 is complete and ends.

Alternatively, when the decision block 312 determines that the requested image is not "in process" or when the decision block 314 determines that a time-out has occurred, then the GET image processing 300 aborts its attempt to produce an accelerated version of the requested image and instead operates to satisfy the request for the image by other means. This way the GET image processing 300 will not wait too long for an "an in process" image to complete. Once the accelerated version is determined to not be timely available (following a time-out or the requested image not being "in process"), the GET image processing can operate in a variety of different ways. One alternative, as depicted in block 316, is to instruct the proxy server 102, 202 to complete the request for the image. Another alternative is to have the GET image processing 300 supply the original version or some other version (perhaps partially accelerated) from the image store to the requestor if any of such images were to be available in the image store.

Figure 4:
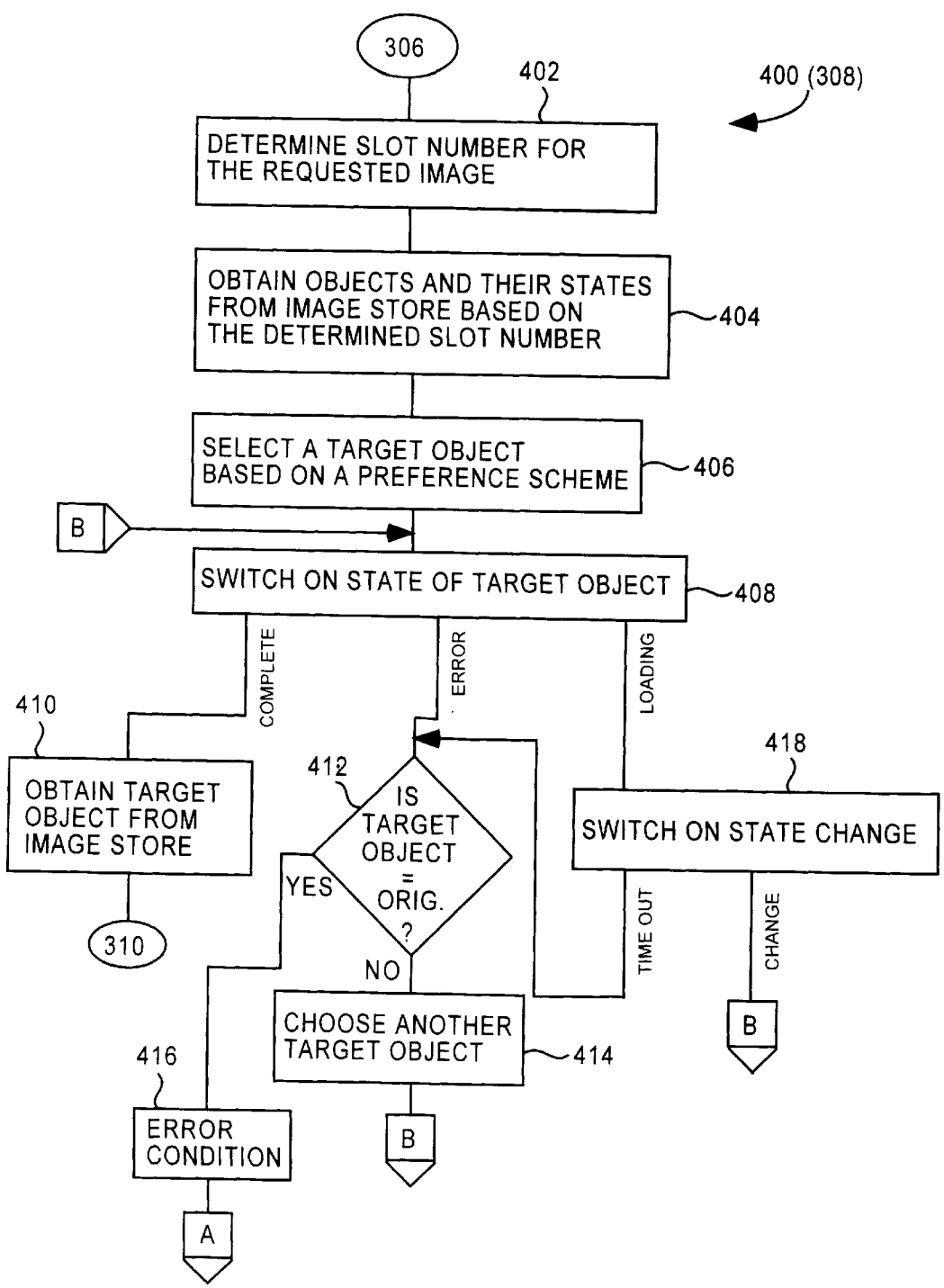
FIG. 4 is a flow diagram of image retrieval processing according to an embodiment of the invention.

FIG. 4 is a flow diagram of image retrieval processing 400 according to an embodiment of the invention. The retrieval processing 400 is, for example, performed by the acceleration server 110, 204 and represents detailed processing operations performed by the blocks 306, 312 and 314 illustrated in FIG. 3 according to one embodiment of the invention.

The image retrieval processing 400 initially determines 402 a slot number for the requested image. The slot number designates a location within the image store where the requested image is stored or will be stored in the image store. Next, objects and their states are obtained 404 from the image store based on the determined slot number. Namely, in this example, the objects and their states stored according to the determined slot number are obtained in block 404. The objects represent different versions of a particular image. As an example, these different versions include an original version and various different accelerated versions. A representative construction of the slots and their objects within the image store is discussed below with respect to FIG. 5.

Following block 404, a target object is selected 406 based on a preference scheme. Here, one of the objects that was obtained in block 404 is selected to be a target object. The preference scheme with which the selection is made can use any of a variety of techniques whether they be user directed, system directed, or some combination of both.

Then, based on the state of the selected target object, the processing flow is switched 408 between one of three paths based on the selected target object. When the state of the target object is designated as being complete (first path), then the target object is obtained 410 from the image store. After obtaining the target object from the image store, the image retrieval processing 400 is complete and ends, with processing returning to block 310 in FIG. 3.

On the other hand, when the state of the target object is "error" (second path), then the image retrieval processing 400 uses a decision block 412 to determine whether the target object is equal to the original version of the requested image. When the decision block 412 determines that the target object is not the original version, then another target object is chosen from the various objects obtained in block 404. Here, to the extent available, another of the available objects is selected as the target object because the previously selected object to be the target object has an error state. When the target object is the original version, then it is understood that there are no other options available given that this is understood to be the least preferred of the objects. Following block 414, the image retrieval processing 400 returns to repeat block 408 and subsequent blocks. On the other hand, when the decision block 412 indicates that the target object is the original version, then an error condition is noted 416 and the processing jumps to block 316 in FIG. 3 where the requested images is requested from the network by the proxy server 102, 202.

Yet another alternative is when the state of the target object is "loading" (third path). When the block 408 determines that the state of the target object is "loading," then the image retrieval processing 400 flow is switched 418 based on a state change. Here, the state change of the target object is being observed. If a state change is determined in block 418 to have occurred, then the image retrieval processing 400 returns to repeat block 408 and subsequent blocks. This switch operation is useful to conserve processing resources when the image retrieval processing is waiting for the image "loading" (i.e., the selected target object) to be completed. The processing resources are conserved by using notifications instead of state polling. On the other hand, when a time-out has occurred, block 418 causes the waiting for the selected target image that is "loading" to abort. Once the switch operation in block 418 is aborted, then the image retrieval processing 400 returns to repeat the decision block 412 and subsequent blocks so that retrieval of another one of the available objects can be attempted. Accordingly, in the case of a requested image being "loaded" when needed, the image retrieval processing 400 will await the completion of the loading but only up to a maximum time duration set. The maximum time duration is set by the time-out associated with the block 418.

Figure 5:
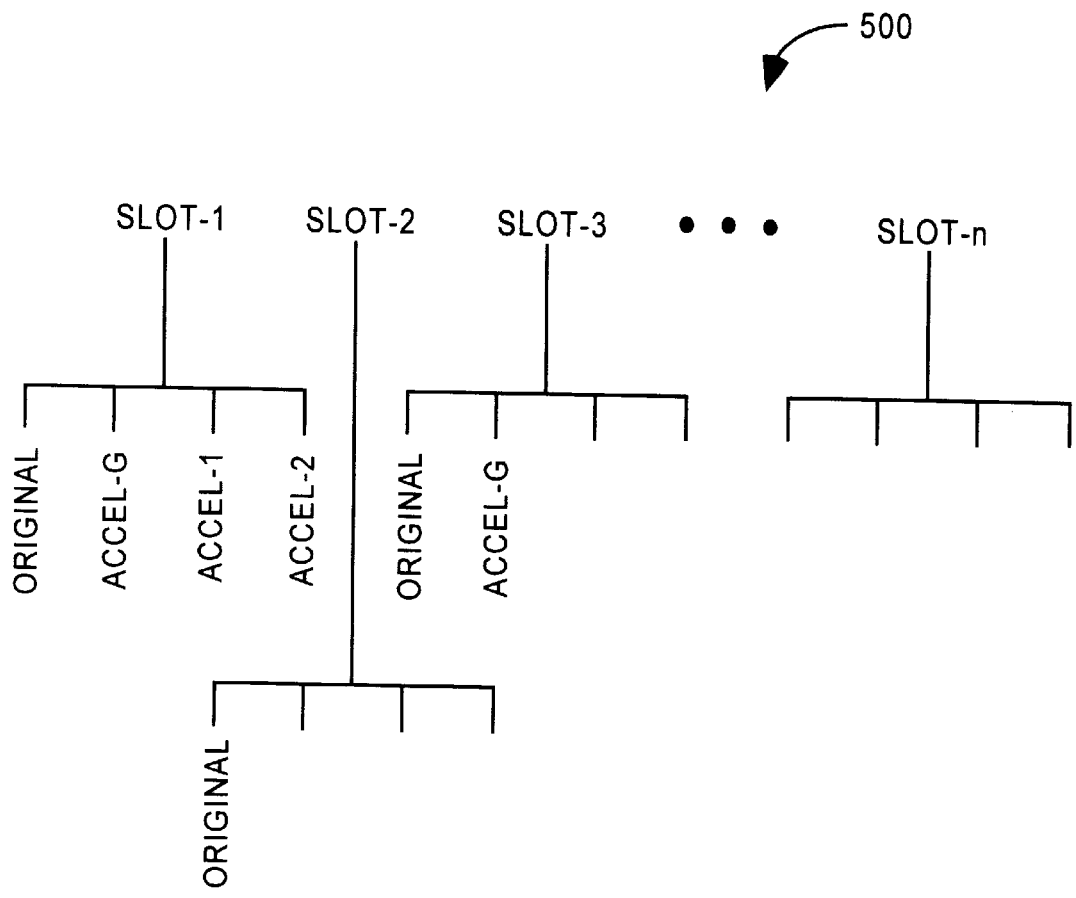
FIG. 5 is a schematic diagram of a representative slot organization within an image store according to an embodiment of the invention.

FIG. 5 is a schematic diagram of a representative slot organization 500 within an image store according to an embodiment of the invention. The slot organization 500 includes n-slots, denoted SLOT-1, SLOT-2, SLOT-3, . . . , SLOT-n. Within each of the slots, there are stored one or more objects that have a predetermined structure. For example, in an illustrative state, the objects stored within SLOT-1 include an original object, an ACCEL-G object, an ACCEL-1 object, and an ACCEL-2 object. ACCEL-G refers to a general accelerated version, ACCEL-1 refers to a first particular accelerated version, and ACCEL-2 refers to a second particular accelerated version. In the illustrative state, SLOT-2 includes only an original object, and SLOT-3 includes an original object and an ACCEL-G object.

In general, each slot can include zero or more objects. A representative structure for a slot for Internet applications is provided below in Table 1, and a representative structure for the objects of a slot is provided in Table 2 below.

TABLE 1

SLOT DATA STRUCTURE

URL
COOKIE
AUTHORIZATION
HTTP DATA
OBJECT POINTERS

In Internet applications, objects (e.g., images or pages) are requested by a Universal Resource Locator (URL). However, additionally, there is often some additional information associated with a object request such as cookies, authorization information, and HTTP data. Cookies are used to maintain state information and/or provide identification information with the stateless HTTP protocol. Hence, as indicated by the slot data structure, a slot is determined in one embodiment from not only the URL and associated HTTP data but also any cookies and authorization information that may exist. The identified slot then contains one or more object pointers that point to the objects within the slot.

Each slot has one or more objects stored therein. Each object is referred to as an entry in the slot. In one embodiment, the data structure for the entries in the slots is as shown in Table 2 which includes an object number, an object length, a MIME type (from the HTTP data), statistics data (optional), state information, and either the object data (e.g., image data) itself or a pointer thereto.

TABLE 2

SLOT ENTRY DATA STRUCTURE

OBJECT NO.
OBJECT LENGTH
MIME TYPE
STATISTICS DATA
STATE

TABLE 2-continued

SLOT ENTRY DATA STRUCTURE

OBJECT DATA (OR
POINTER)

The processing associated with the invention is preferably implemented in a multi-threaded manner to improve performance. Such performance is needed when the proxy system is used by a larger number of users. With such multiple threads they often need to wait for an object (e.g., image) to complete is loading into the image store. Normally, the object being loading and being monitored by the system is an accelerated version of a requested image.

A system in which separate processes or threads need to query the existence or state change of an object is called an asynchronous system. In such a system, one set of processes or threads, or a combination of the two, is responsible for write operations, and another set of processes or threads is responsible for read and query operations. Or possibly the same set of processes or threads is responsible for write operations at one point in time, and read operations at a different point in time. In either case the problem which arises is how to determine from a querying process that the correct data has finished writing in a separate process.

Conventionally, a simple method for solving this problem is to constantly query the object being written to find out if all writes have completed. In the case where the potential existence of an object is in question, the expected location of that object can be repeatedly queried until it is discovered or a preset time-out elapses.

The most significant problem with the methods described above is that any operation which performs a continuous query can quickly use up a significant amount of system resources, possibly all of the CPU resources available to the system. Continuous querying, as conventionally done, results in active waiting. According to one aspect of the invention, the waiting on the completion of the writing is idle waiting. Moreover, the wait idles longer as network bandwidth becomes scarcer. Such idle waiting allows other portions of the system to accomplish work in the interim. In other words, system resources are freed up and available or other processes or threads during the waiting periods. The switch operations in blocks 408 and 418 preferably perform such idle waiting.

In any asynchronous system where independent threads and processes are writing data that other threads and processes must read only when the data is ready, an embodiment of the invention allows for an inexpensive (in terms of processing resources) yet sure way of checking for ready states. The embodiment uses explicit readiness checks and wait-on-ready-event processes or threads. The explicit readiness checks guarantee that the querying process can ensure that the ready-event is not missed. Moreover, the wait-on-ready-events guarantee that the querying process does not expend inordinate amounts of system resources in active waiting.

In an effort to avoid continuous querying when attempting to determine whether an object that has been requested is ready and available, the invention avoids continuous querying and instead uses explicit readiness checks. In addition, the invention ensures that the overall time-out is limited so that guaranteed minimum level of performance is achieved.

In one implementation, the proxy system sets up a two-stage sequence of waits, each of which is based on a total time-out amount which is user-configurable. In the first stage of the wait sequence, a small fraction of the total time-out is used to wait on an object coming into existence. All idle waiting time is implemented as a hold on event, rather than a simple sleep. After an object is found to come into existence, the second stage of the wait sequence is entered. In this portion, the process waits for an object to enter a ready state. The total wait time for this stage is the total time-out amount minus the small fraction allotted for the first stage. This second stage is divided into three tiers or portions. During the first tier of the second stage, a series of short wait loops is repeated. First, the object's state is explicitly checked. Then a wait-on-ready-event is entered for a short period of time (e.g., on the order of a hundred milliseconds or a few seconds). If the wait-on-ready-event terminates without begin signaled by the object, the object is checked again. The reason for repeatedly checking again is that this wait loop can check for asynchronous state changes between separate processes or threads. In a multi-process or multi-thread environment, the querying process can check the state of desired object, find it not to be ready, and before it has a chance to enter the hold-on-ready-event, the writing process can set the object to a ready state. Thus the desire for several short waits interrupted by explicit checks. An important part of the implementation is that the wait-check-wait -check loop is divided into three tiers. During the first tier, a short portion of the total time-out is used for each wait-on-ready-event. Once the first tier has expired, the second tier begins and operates as does the first tier but with the wait duration for each wait-on-ready-event being longer. After the second tier has completed without finding the object in a ready state, the wait-on-ready-event time-out becomes even longer for a third tier. The third tier repeats until the total time-out has expired, in which case the proxy system assumes that the object will not enter a ready state.

One advantage of the multi-tiered approach is that as the necessary resources (e.g. network bandwidth) for moving an object into a ready state become scarcer, less work is expended determining the readiness of the object. Thus, other portions of the proxy system have a greater chance to complete their tasks, and as their work gets done, the scarce resource which is impeding the entry of an object into a ready state is used by fewer portions of the system. This in turn allows for current waits-on-ready-event to complete. At the same time, the object querying portion of the proxy system will never find itself in a position where its waiting a long period of time on a ready-event which it simply missed.

Figure 6A:
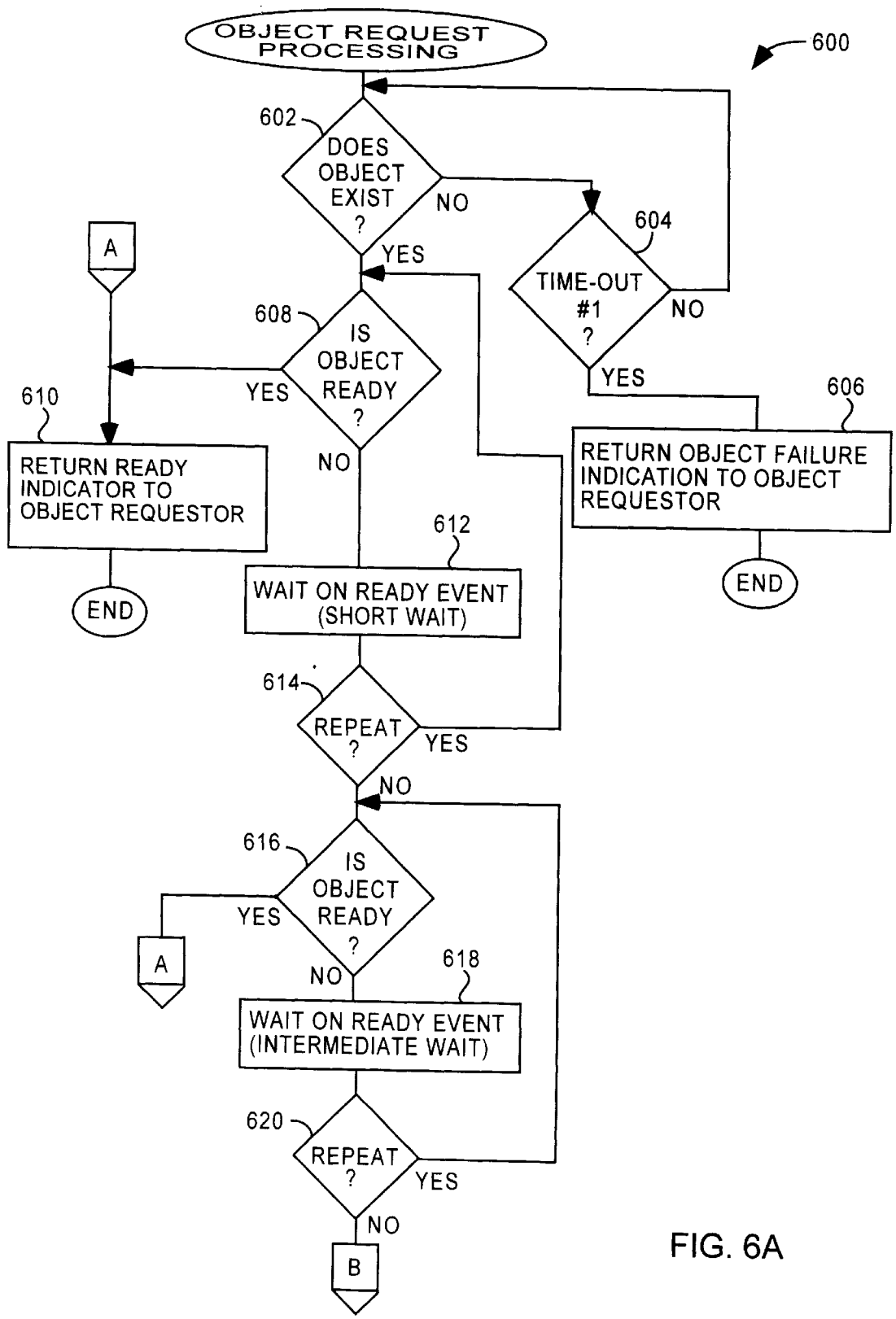
FIGS. 6A and 6B illustrate a flow diagram of object request processing according to an embodiment of the invention.
Figure 6B:
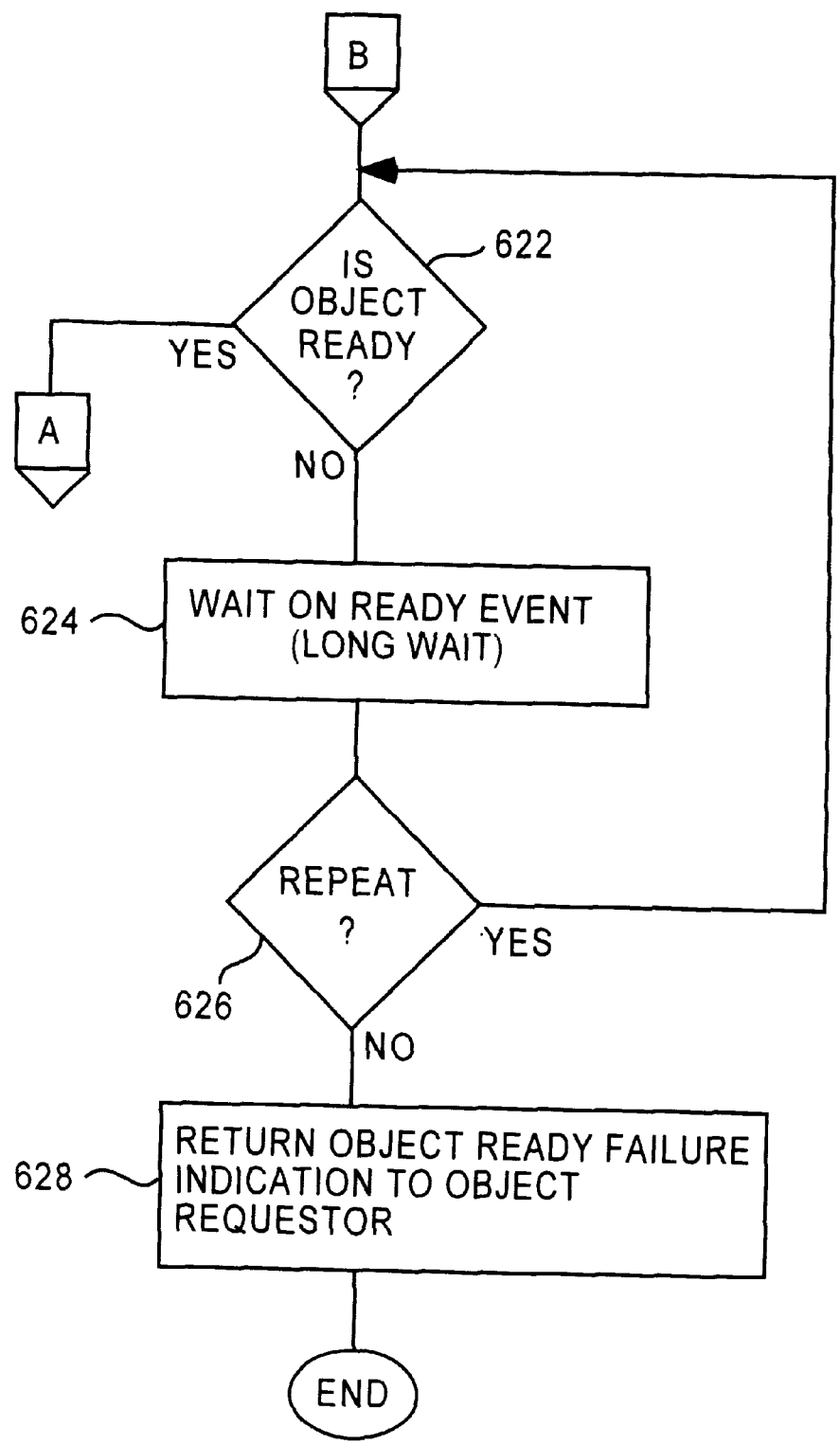

FIGS. 6A and 6B illustrate a flow diagram of object request processing 600 according to an embodiment of the invention. The object request processing 600 uses the two-stage sequence of waits with the second stage having a multi-tiered approach in querying objects as discussed above. The object request processing 600 is, for example, associated with the switching operations of blocks 408 and 418 illustrated in FIG. 4 or the like where the proxy system waits for a object to be available and ready in an object store (e.g., image store).

The object request processing 600 initially determines in decision block 602 whether the requested object exists. If the requested object does not yet exist, a decision block 604 determines whether a first time-out has occurred. If the decision block 604 determines that the first time-out has occurred, an object failure indication is returned 606 to the object requestor. The object request processing 600 is controlled by a total time-out amount that represents that time duration that the system is willing to wait for the requested object to exist and be ready. Following block 606, the object request processing 600 is complete and ends since in this case the requested object is unavailable.

On the other hand, when the decision block 604 determines that the first time-out has not occurred, the processing returns to the decision block 602 for again determining whether the object exists. Hence, if the decision block 602 determines that the object does exist within the first time-out, then the object request processing 600 can continue because the object is in existence.

When the object request processing 600 does continue, a decision block 608 next determines whether the requested object is ready. If the decision block 608 determines that the requested object is ready, a return ready indication is forwarded to the object requestor. The return ready indicator indicates to the object requestor that the requested object is ready to be retrieved from the object store. Following block 610, the object request processing 600 is complete and ends.

On the other hand, when the decision block 608 determines that the requested object is not ready, a wait condition is entered in block 612. The wait condition is implemented by a thread or process entering a wait on a ready event, wherein the wait amount is a short wait. In other words, the wait condition in block 612 waits for at most a predetermined period of time for a ready event to occur, and if the ready event occurs the process or thread awakens. This wait condition is referred to as a first tier wait. Even if the ready event does not occur, the process or thread will also awaken when the short wait has expired. While the process or thread is waiting for the ready event, other processes or threads can utilize the system resources.

Following block 612, a decision block 614 determines whether to repeat the first tier wait for the requested object. When the decision block 614 determines that the first tier wait should be repeated, then the object request processing 600 returns to repeat the decision block 608 and subsequent blocks. On the other hand, when the decision block 614 determines that the first tier wait should not be repeated, a decision block 616 determines whether the requested object is ready.

When the decision block 616 determines that the requested object is ready, then the object request processing 600 performs block 610 as discussed above. On the other hand, when the requested object is determined by the decision block 616 not to be ready, then a wait condition on a ready event is entered in block 618. The wait condition here is an intermediate wait length that is longer than the short wait length of block 612. The wait condition in block 618 waits for at most a predetermined period of time for a ready event to occur, and if the ready event occurs the process or thread awakens. This wait condition is referred to as a second tier wait. Even if the ready event does not occur, the process or thread will also awaken when the intermediate wait has expired. Again, during the wait condition, other threads and processes can utilize the system resources that would otherwise be used by a thread or process performing the object request processing 600.

Following block 618, a decision block 620 determines whether the second tier wait condition should be repeated. When the decision block 620 determines that the second tier wait condition should be repeated, then the object request processing 600 returns to repeat the decision block 616 and subsequent blocks. On the other hand, when the decision blocks 620 determines that the second tier wait condition should not be repeated, then a decision block 622 determines whether the requested object is ready.

When the decision block 622 determines that the requested object is ready, then the object request processing 600 performs block 610 so that the object requestor that the requested object is ready to be retrieved from the object store. On the other hand, when the decision block 622 determines that the requested object is not ready, then a wait condition on a ready event is entered into block 624. The wait condition in block 624 is a long wait that has a longer duration than either the short wait or the intermediate wait. The wait condition in block 624 waits for at most a predetermined period of time for a ready event to occur, and if the ready event occurs the process or thread awakens. This wait condition is referred to as a third tier wait. While the process or thread is waiting for the ready event, other processes or threads can utilize the system resources.

Following block 624, a decision block 626 determines whether the third tier wait condition should be repeated. When the decision block 626 determines that the third tier wait should be repeated, the object request processing 600 returns to repeat the decision block 622 and subsequent blocks. On the other hand, when the decision block 626 determines that the third tier wait should not be repeated, then an object ready failure indication is returned to the object requester in block 628. The object ready failure indication informs the object requestor that the requested object is not able to be supplied from the object store within the time constraints of the total time-out amount. Following block 628, the object request processing 600 is complete and ends.

The total time-out amount and the duration of the various wait conditions can vary greatly depending on the worst case level of service being guaranteed. In one example, a total time-out amount could be 39 seconds. This 39 seconds is then distributed to various time-outs or wait conditions of the object request processing. As an example, the 39 seconds can be apportioned or distributed as follows. The first time-out amount can be 1 second, the short wait can be 3 seconds and repeated up to three times, the intermediate wait can be 4 seconds and repeated up to three times, and the long wait can be 10 seconds and repeated up to twice.

The advantages of the invention are numerous. One advantage of the invention is that accelerated delivery of content to requesting clients is achieved while at the same time being able to guarantee a minimum level of service (e.g., responsiveness) to the clients. Substantial performance gains in responsiveness and bandwidth utilization are able to be achieved without running the risk that the acceleration processing overburden the system such that what would otherwise be performance gains turn into performance losses. In one case, the invention provides in the worst case the same level of service that would be perceived by the client if the proxy system according to the invention were performing only connection services as a conventional proxy server. Another advantage of the invention is that it mitigates the risk of implementing new features or functions to server systems by ensuring that they will not severely degrade the level of service provided.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for delivering an object to a requestor at a local computer, said method comprising the operations of:
   (a) receiving, at an intermediate computer, a request for an object that is primarily stored on a remote computer, the local computer being capable of coupling to the intermediate computer via a first network, and the intermediate computer being capable of coupling to the remote computer via a second network;
   (b) determining whether the requested object is available from an object store associated with the intermediate computer, the object store providing temporary secondary storage for objects;
   (c) when said determining (b) determines that the requested object is available from the object store,
       (c1) retrieving the requested object from the object store, and
       (c2) supplying the retrieved object obtained from the object store to the requestor; and
   (d) when said determining (b) determines that the requested object is being obtained but is not presently available from the object store,
       (d1) awaiting for a determined amount of time for the requested object to become available from the object store,
       (d2) subsequently retrieving the requested object from the remote computer when the requested object is still not available after said awaiting for the determined amount of time, and
       (d3) thereafter supplying the retrieved object obtained from the remote computer to the requestor.

2. A method as recited in claim 1, wherein the requested object is an image file, and the object store is an image store.

3. A method as recited in claim 2, wherein the image store is stored on the intermediate computer.

4. A method as recited in claim 2,
   wherein the requested image file stored in the image store includes at least an accelerated version of the requested image file,
   wherein said determining (b) determines whether the accelerated version of the requested image file is available from the image store,
   wherein said retrieving (c1) and said supplying (c2) are with respect to the accelerated version of the requested image file, and
   wherein said awaiting (d1) is with respect to the accelerated version of the requested image file.

5. A method as recited in claim 4, wherein retrieving (d2) and said supplying (d3) are with respect to an original, non-accelerated version of the requested image file.

6. A method as recited in claim 5, wherein the determined amount of time ensures a worse case responsiveness no worse than would otherwise occur had said method never attempted to produce the accelerated version of the requested image file.

7. A method for delivering content from a remote machine to a local machine, where the local machine couples to a proxy machine, and the proxy machine couples to the remote machine through a network of computers, said method comprising the operations of:
   (a) intercepting, at the proxy machine, a web page request in route from the local machine to the remote machine through the network;
   (b) allowing the web page request to be sent from the proxy machine to the remote machine;
   (c) delivering the requested web page to the proxy machine, the requested web page includes at least one image file request embedded in the requested web page;
   (d) forwarding the requested web page from the proxy machine to the local machine;
   (e) identifying, at the proxy machine, the at least one image file request in the requested web page;
   (f) pre-fetching the identified at least one image file request, with the content for each of the image file requests being obtained from the remote machine associated with the image file request;
   (g) attempting to produce an accelerated version for the identified at least one image file request at the proxy machine;
   (h) issuing, from the local machine, the at least one image file request embedded in the requested web page subsequent to receiving the request web page at the local machine;
   (i) intercepting, at the proxy machine, the at least one image file request in route from the local machine to the remote machine through the network;
   (j) preventing the at least one image file request from being sent from the proxy machine to the remote machine for at least a determined period of time while said attempting (g) to produce the accelerated version of the identified at least one image file request is ongoing;
   (k) delivering the accelerated version of a requested image file for the identified at least one image file request to the local machine from the proxy machine when said attempting (g) completes within the determined period of time; and
   (l) alternatively, delivering an original version of the requested image file for the identified at least one image file request to the local machine from the proxy machine when said attempting (g) does not completes within the determined period of time, the original version of the requested image file being obtained by said pre-fetching (f) from the remote machine or by releasing said preventing (g) so that the at least one image file request is sent from the proxy machine to the remote machine.

8. A method as recited in claim 7, wherein the local machine couples to the proxy machine via a first connection, and the proxy machine couples to the network of computers via a second connection, the second connection supporting substantially greater data transmission rates than the first connection, and
   wherein said pre-fetching (f) of the identified at least one image file request from the remote machine associated with the image file request is performed using the second connection of the proxy machine to the network of computers.

9. A method as recited in claim 8, wherein the network of computers is the Internet.

10. A method as recited in claim 7, wherein said identifying (e) and said pre-fetching (f) are performed substantially simultaneously with said forwarding (d).

11. A method as recited in claim 7, wherein during said attempting (g) to produce an accelerated version for the identified at least one image file requests, at least a part one of said delivering (c) and said issuing (h) is concurrently performed.

12. A method as recited in claim 7, wherein said proxy machine includes a proxy server and an acceleration server, and wherein said pre-fetching (f) and attempting (g) is performed by the acceleration server.

13. A proxy system for distributing data objects, comprising:

a proxy server, said proxy server operates to receive an object request having a requested object from a network browser and to manage the forwarding of the requested object to the network browser, said proxy server being connected to a network; and an acceleration unit coupled to said proxy server, said acceleration unit being connected to the network through a second connection, said acceleration unit operates to identify the requested object, pre-fetch the requested object having an original size from a content provider coupled to the network, reduce the size of the retrieved object to a reduced size, and provide the requested object with the reduced size to said proxy server, wherein when the requested object with the reduced size is determined not to be available from said acceleration unit for more than a determined period of time, said proxy server obtains the requested object of the original size from said acceleration unit or from the content provider directly and provides the requested object having the original size to the network browser.

14. A system as recited in claim 13, wherein said acceleration unit comprises:

an accelerator, said accelerator operates when acceleration has been determined to be advisable to receive the requested object having the original size and then to reduce the size of the requested object with the original size so as to produce the requested object with the reduced size;

an acceleration monitor coupled to said accelerator, said acceleration monitor determines whether the requested object with the reduced size has been produced within the determined period of time; and an object store operatively coupled to said accelerator, said object store operates to store at least the requested object with the reduced size.

15. A system as recited in claim 14, wherein when said acceleration monitor determines that the requested object with the reduced size has not yet been produced within the determined amount of time, then said proxy server forwards the requested object with the original size to the network browser.

16. A system as recited in claim 14, wherein said object store stores objects with the reduced size and objects with the original size, and wherein when said acceleration monitor determines that the requested object with the reduced size has not yet been produced within the determined amount of time, then said proxy server forwards the requested object with the original size from said object store to the network browser.

17. A system as recited in claim 14, wherein the requested object is an image file.

18. A system as recited in claim 13, wherein said acceleration unit comprises:

an observer, said observer operates to review the requested object to determine whether the requested object is likely capable of being accelerated by said acceleration unit;

an object manager operatively coupled to said observer, said object manager operates to manage the retrieval of the requested object having the original size from the content provider via the second connection to the network, and to examine the requested object to determine whether acceleration would be advisable;

an accelerator operatively coupled to said object manager, said accelerator operates when acceleration has been determined to be advisable to receive the requested object having the original size from said object manager and then to reduce the size of the requested object with the original size so as to produce the requested object with the reduced size;

an acceleration monitor coupled to said image manager and said accelerator, said acceleration monitor determines whether the requested object with the reduced size has been produced within a predetermined amount of time; and an object store operatively coupled to said accelerator and said object manager, said object store operates to store at least the requested object with the reduced size, and wherein when said acceleration monitor determines that the requested object with the reduced size has not yet been produced within the determined amount of time, then said proxy server forwards the requested object with the original size to the network browser.

19. A computer readable medium containing program instructions for delivering an object to a requestor at a local computer, said computer readable medium comprising:

first computer readable code for receiving, at an intermediate computer, a request for an object that is primarily stored on a remote computer, the local computer being capable of coupling to the intermediate computer via a first network, and the intermediate computer being capable of coupling to the remote computer via a second network;

second computer readable code for determining whether the requested object is available from an object store associated with the intermediate computer, the object store providing secondary temporarily storage for objects;

third computer readable code for retrieving the requested object from the object store, and supplying the retrieved object obtained from the object store to the requestor, when said second computer readable code determines that the requested object is available from the object store; and fourth computer readable code for awaiting for a determined amount of time for the requested object to become available from the object store, subsequently retrieving the requested object from the remote computer when the requested object is still not available after said awaiting for the determined amount of time, and thereafter supplying the retrieved object obtained from the remote computer to the requestor, when said second computer readable code determines that the requested object is being obtained but is not presently available from the object store.

20. A computer readable medium 19, wherein the requested object is an image file, and the object store is an image store, wherein the requested image file stored in the image store includes at least an accelerated version of the requested image file, and wherein said second computer readable code determines whether the accelerated version of the requested image file is available from the image store.

* * * * *